(12) United States Patent
Dabao

(10) Patent No.: US 9,592,457 B2
(45) Date of Patent: Mar. 14, 2017

(54) OIL EXTRACTOR

(71) Applicant: Edwin Pajarillo Dabao, Fort Pierce, FL (US)

(72) Inventor: Edwin Pajarillo Dabao, Fort Pierce, FL (US)

(*) Notice: Subject to any disclaimer, the term of this patent is extended or adjusted under 35 U.S.C. 154(b) by 128 days.

(21) Appl. No.: 14/619,687

(22) Filed: Feb. 11, 2015

(65) Prior Publication Data

US 2015/0224422 A1 Aug. 13, 2015

Related U.S. Application Data

(60) Provisional application No. 61/938,479, filed on Feb. 11, 2014.

(51) Int. Cl.
*B01D 11/02* (2006.01)
(52) U.S. Cl.
CPC .................. *B01D 11/0296* (2013.01)
(58) Field of Classification Search
CPC .................................................. B01D 11/0296
See application file for complete search history.

(56) References Cited

U.S. PATENT DOCUMENTS

| | | | | |
|---|---|---|---|---|
| 1,358,048 A | * | 11/1920 | Anhaltzer | A23F 5/262 202/170 |
| 1,835,878 A | * | 12/1931 | Karrick | B01D 11/0223 422/281 |
| 2,101,819 A | * | 12/1937 | Roehrich | B01D 11/0219 202/170 |
| 2,777,757 A | * | 1/1957 | Burgeff | B01D 11/0219 422/261 |
| 5,510,029 A | * | 4/1996 | Benian | B01D 29/21 210/214 |
| 5,667,683 A | * | 9/1997 | Benian | B01D 29/15 210/409 |

(Continued)

FOREIGN PATENT DOCUMENTS

| CA | 2241970 C | * | 8/2002 | ............. A23N 12/08 |
| DE | WO 9416791 A1 | * | 8/1994 | ......... B01D 11/0215 |

(Continued)

*Primary Examiner* — Regina M Yoo
(74) *Attorney, Agent, or Firm* — Dunlap Bennett & Ludwig PLLC

(57) ABSTRACT

An oil extraction device is provided. The oil extraction device includes an evaporation chamber having a top end and a bottom end. The top end is sealed and the bottom end includes a collection bowl. A filter cartridge is disposed within the evaporation chamber and includes a top end, a bottom end, and an internal cavity formed to secure a plant product within. The bottom end of the filter cartridge includes a filter and a drip cap with an opening leading into the collection bowl. The present invention further includes a solvent canister securing a solvent within. A delivery line leads from the solvent canister into the top end of the filter cartridge and a circulation line leads from the top end of the evaporation chamber to the solvent canister. A pump may be used to vacuum the solvent through the lines. The solvent may travel from the solvent canister into the filter cartridge traveling through the opening at the bottom and turning into a vapor. The vapor is vacuumed out of the evaporation chamber and into the circulation line, thereby travels back to the solvent canister.

11 Claims, 4 Drawing Sheets

(56) References Cited

U.S. PATENT DOCUMENTS

| | | | | |
|---|---|---|---|---|
| 5,702,607 A * | 12/1997 | Lawson | ............... | B01D 29/27 134/111 |
| 5,954,071 A * | 9/1999 | Magliocca | ............ | B01D 33/11 134/109 |
| 7,297,256 B2 * | 11/2007 | Loftis | ................. | B01D 27/00 137/268 |
| 9,144,751 B2 * | 9/2015 | Wasserman | ........ | B01D 11/0215 |
| 2005/0261197 A1 * | 11/2005 | Aoki | ................. | A61K 31/353 514/12.2 |
| 2006/0180537 A1 * | 8/2006 | Loftis | ................. | B01D 27/00 210/209 |
| 2010/0119606 A1 * | 5/2010 | Whittle | ............ | B01D 11/0242 424/484 |
| 2011/0233203 A1 * | 9/2011 | Visinoni | ................ | A23L 1/00 219/756 |
| 2013/0251626 A1 * | 9/2013 | Wallace | ................. | C01B 3/06 423/657 |
| 2014/0044600 A1 * | 2/2014 | McAlister | ............ | B01J 19/087 422/128 |
| 2014/0193303 A1 * | 7/2014 | Ellis | ................. | B01D 11/0203 422/119 |

FOREIGN PATENT DOCUMENTS

| | | | | |
|---|---|---|---|---|
| DE | 19612037 A1 * | 10/1997 | ......... | B01D 11/0219 |
| EP | 1033160 A2 * | 9/2000 | ........... | A23L 1/3002 |
| WO | WO 2013138616 A1 * | 9/2013 | ............. | B01D 8/00 |
| WO | WO 2013192415 A2 * | 12/2013 | ............... | B01D 3/38 |

* cited by examiner

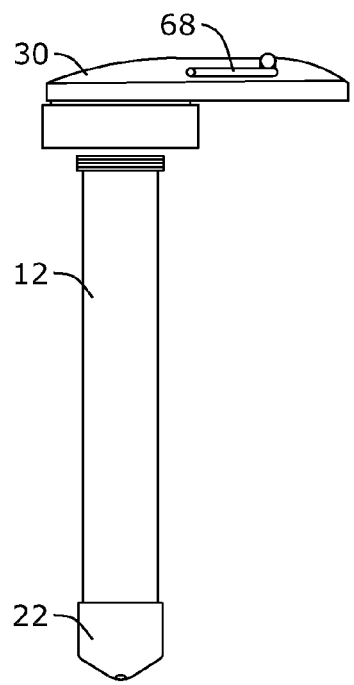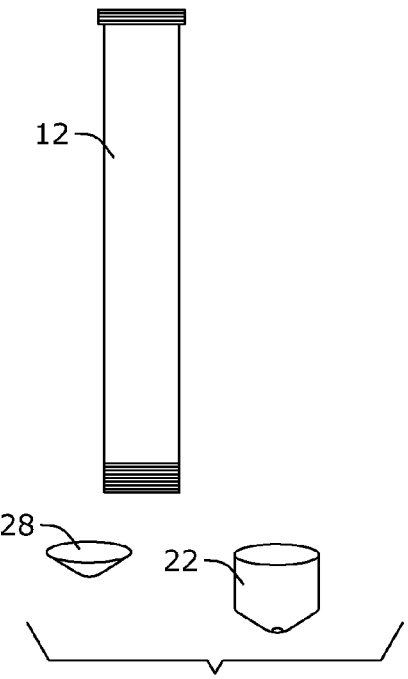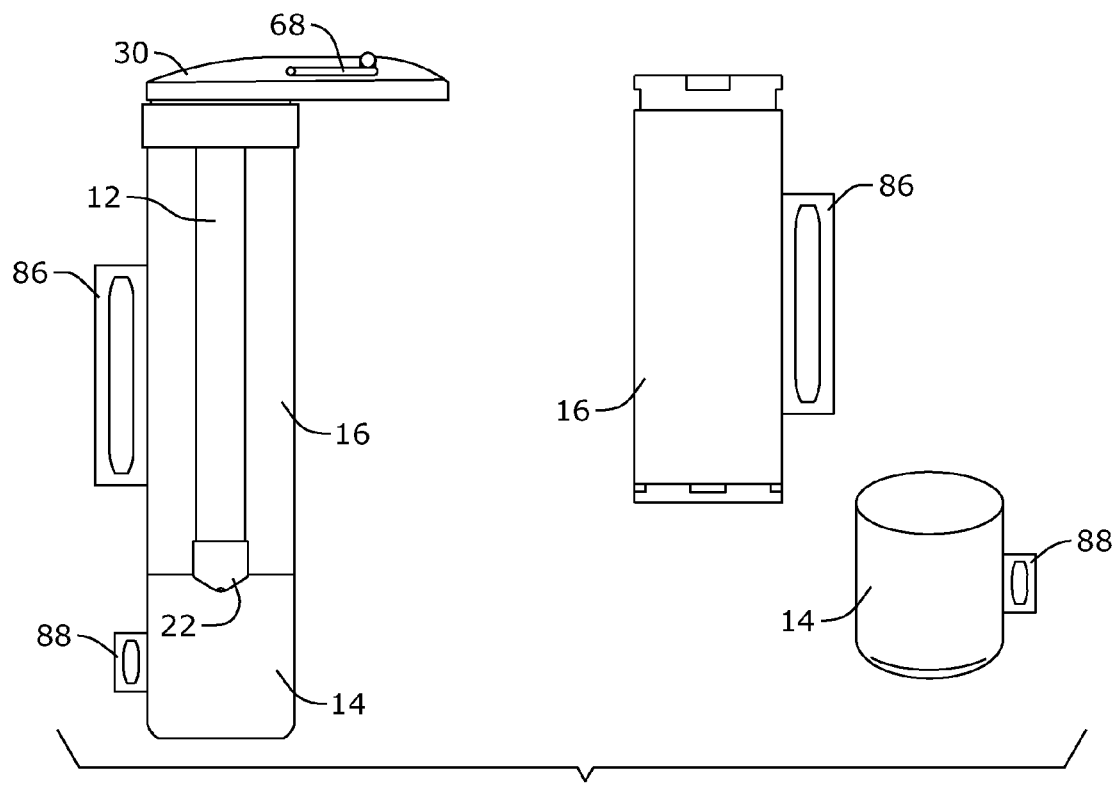

OIL EXTRACTOR

CROSS-REFERENCE TO RELATED APPLICATION

This application claims the benefit of priority of U.S. provisional application No. 61/938,479, filed Feb. 11, 2014, the contents of which are herein incorporated by reference.

BACKGROUND OF THE INVENTION

The present invention relates to an oil extractor and, more particularly, to a cannabis oil extractor.

Medical Cannabis has been legalized in more than twenty states, while recreational cannabis is legal in four. Due to the increased legalization, there has been a growing need for a portable apparatus that can be used to extract oils easily, safely, and efficiently.

Currently, plant oil extraction is a long, tedious, and often times dangerous process. Common oil extraction techniques employed in the medical cannabis industry use alcohol, hexane, and other volatile solvents that require hours of distillation and purification. In most cases, the fumes from these volatile solvents are not recovered, but are instead made to evaporate into the surrounding air, which create health, fire, and environmental hazards. Lately, there has been a large demand for cannabis oil, and supply cannot meet demand because of these laborious and hazardous processes.

Another method involves cooking the plant material in hot oil for half an hour, straining the plant material, and setting it aside for use in cakes and pastries. Cooking of the cannabis requires high temperatures, which changes the structure of THC, making it psychoactive. For patients, needing larger doses to alleviate symptoms of certain ailments, the increased psychoactivity limits the patient's intake. Therefore, proper doses may not be achieved with cooking.

As can be seen, there is a need for a device to safely, effectively and quickly extract oils from cannabis.

SUMMARY OF THE INVENTION

In one aspect of the present invention, an oil extraction device comprises: an evaporation chamber comprising a top end and a bottom end, wherein the top end is sealed and the bottom end comprises a collection bowl; a filter cartridge within the evaporation chamber and comprising a top end, a bottom end, and an internal cavity formed to secure a plant product within, wherein the bottom end comprises a filter and a drip cap comprising an opening leading into the collection bowl, and wherein the top is sealed; a solvent canister; a delivery line leading from the solvent canister into the top end of the filter cartridge; a circulation line leading from the top end of the evaporation chamber to the solvent canister; and at least one pump, wherein a solvent travels from the solvent canister into the filter cartridge traveling through the opening and turning into a vapor, wherein the vapor is vacuumed out of the evaporation chamber and into the circulation line, thereby traveling back to the solvent canister.

These and other features, aspects and advantages of the present invention will become better understood with reference to the following drawings, description and claims.

BRIEF DESCRIPTION OF THE DRAWINGS

FIG. 5 is an exploded view of a filter assembly of the present invention;

FIG. 6 is an exploded view of a filter assembly of the present invention;

FIG. 7 is an exploded view of an evaporation chamber and a filter assembly of the present invention;

DETAILED DESCRIPTION OF THE INVENTION

Figure 1:
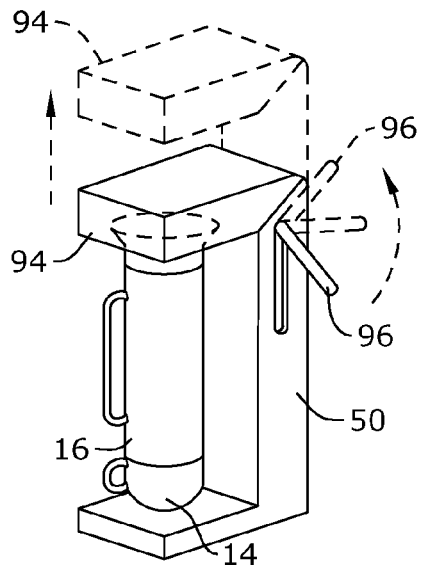
FIG. 1 is a perspective view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes an apparatus and process to extract essential oils from resinous plants, such as cannabis. The present invention may be an electrically powered apparatus that simplifies the extraction process, with many safety features that makes it easy to use around the home, and commercial establishments. The present invention does not need high temperatures or microwave heating, and therefore the present invention preserves the natural chemistry of the cannabinoids in the oil as it naturally occurs in the plant.

In certain embodiments, the present invention may utilize pure butane as a solvent of choice due to the low boiling point of 32° F. Furthermore, a slight increase, or decrease in temperature or pressure transforms the solvent into either liquid or vapor. These properties expedite the extraction process tremendously. Butane may also quickly separate from the final oil by simple low temperature and pressure distillation process, i.e. cold extraction. Cold extraction preserves the flavor and odor of the plant material that the oil is extracted from because low temperatures preserve the volatile terpenes. Therefore, when the final oil product is heated in a vaporizer, and inhaled, the experience is the similar to smoking the plant without the smoke, and the irritation caused by inhaling smoke. Alternatively, the clean, medical grade oil can be taken orally in gel capsules, infused in drinks, topical applications, or used in cooking. The present invention makes use of all the desirable properties of butane, while capturing and recycling 99% of the solvent, making the present invention economical and safe.

The present invention includes an apparatus and process to extract essential oils from resinous plants such as hemp, and cannabis, at low temperatures. The present invention further simplifies oil extraction in a small, portable, and easy to operate apparatus. The present invention may be powered by a 115 VAC current, and utilizes the physical properties of butane gas as the solvent. The speed at which the extraction process takes place reduces the possibility of unwanted plant material getting into the mix. The oil extracted from the apparatus is nearly pure cannabis oil that is waxy, and has a golden amber color.

Referring to FIGS. 1 through 9, the present invention includes an oil extraction device. The oil extraction device includes an evaporation chamber 16 having a top end and a bottom end. The top end is sealed and the bottom end includes a collection bowl 14. A filter cartridge 12 is disposed within the evaporation chamber 16 and includes a top end, a bottom end, and an internal cavity formed to secure a plant product within. The bottom end of the filter cartridge 12 includes a filter 28 and a drip cap 22 with an opening leading into the collection bowl 14. The present invention further includes a solvent canister 10 securing a solvent 100 within. A delivery line leads from the solvent canister 10 into the top end of the filter cartridge 12 and a circulation line leads from the top end of the evaporation chamber 16 to the solvent canister 10. A pump may be used to vacuum the solvent 100 through the lines. The solvent 100 may travel from the solvent canister 10 into the filter cartridge 12 traveling through the opening at the bottom and turning into a vapor. The vapor is vacuumed out of the evaporation chamber 16 and into the circulation line, thereby travels back to the solvent canister 10.

Figure 2:
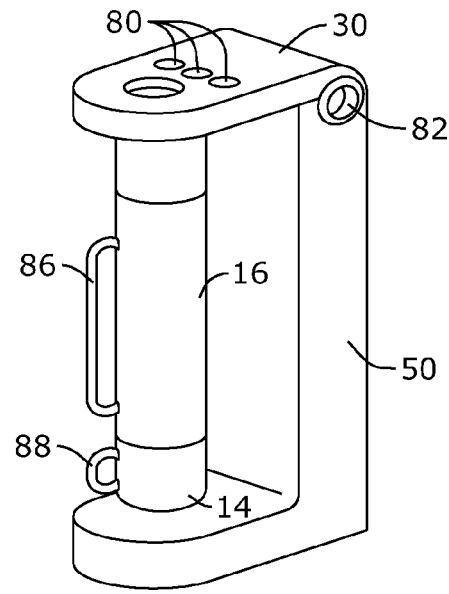
FIG. 2 is a perspective view of an exemplary embodiment of the present invention.

Referring to FIGS. 1 and 2, the present invention may resemble a kitchen appliance including a lid 30 and a housing 50. The present invention may include a pivoting lid 30 that pivots and thereby opens and closes about a hinge 82. In alternate embodiments, the present invention may include a sliding lid 94 activated by a locking lever 96. The sliding lid 94 may move up and down, revealing the top opening of the evaporation chamber 16. Both embodiments allow quick, easy loading, assembly, extraction, breakdown, and clean up. The overall unit may include controls 80 to operate the valves. Arrangement of the control valves may be placed to facilitate operation while giving the apparatus a clean appearance.

Figure 3:
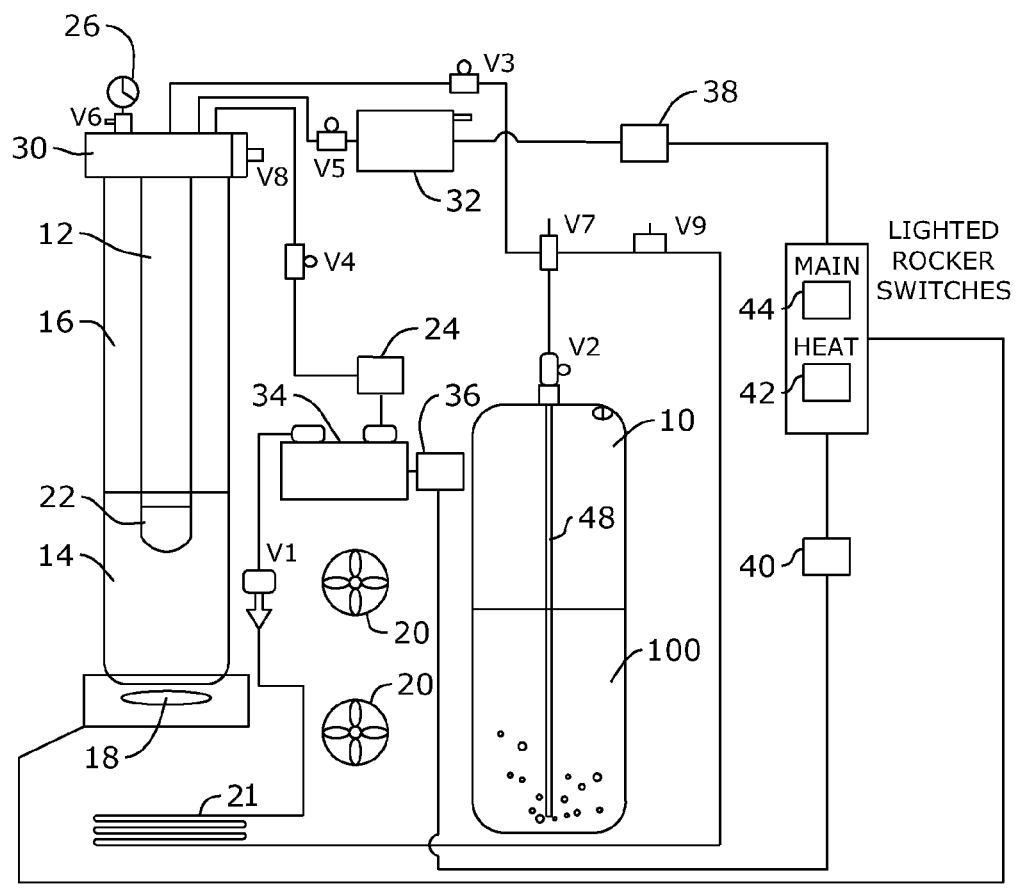
FIG. 3 is a schematic view of an exemplary embodiment of the present invention.

FIG. 3 provides a schematic view of the components of the present invention. A solvent canister 10 is the solvent reservoir for securing solvent 100, such as butane in the liquid form, within. The solvent canister 10 may be made out of stainless steel, and may be within a housing 50 of the unit. In certain embodiments, the solvent canister 10 may include a siphon 48 that runs from the tank valve (V2) to the bottom of the solvent canister 10. Therefore, the butane feed is in a liquefied solvent form. In certain embodiments, the solvent canister 10 may include a glass viewing window to show the level of the liquid. In the operation mode, the solvent canister 10 may only include 30% liquid thereby acting as a buffer to prevent over pressurization. Furthermore, since there is only a small volume of liquid solvent, if for some reason a leak was to occur, the solvent 100 that is vented to the surrounding air cannot reach dangerous concentration levels to cause an explosion.

A delivery line connects to the solvent canister 10 via a tank valve (V2), which allows for gas to be turned off when replacing the canister 10, and/or during storage. The delivery line runs from the tank valve (V2) to the refill valve (V7). This allows refilling the tank when the liquid solvent 100 is low. The delivery line runs from the refill valve to the gas port valve (V3). Opening the gas port valve (V3) allows solvent 100 to move from the canister 10 through the delivery line, through the lid 30 of the present invention and into the filter cartridge 12 during the wash cycle.

Before starting the wash cycle, the air may first be vacuumed out by opening the vacuum valve (V5). In certain embodiments, a handle 68 controlling the vacuum valve (V5) may also activate a vacuum pump switch 38, turning on the vacuum pump 32, which suctions all the air out of the chambers and all the gas lines through a vacuum line and out of the housing via a fan 20. This prevents the contamination of the solvent gas. When vacuum is achieved at about −30 inHG, the vacuum valve (V5) is lowered into a recessed groove, which deactivates the vacuum pump switch 38, powering off the vacuum pump 32. Now the wash cycle can begin by opening the gas port valve (V3), and sending the solvent gas 100 into the filter cartridge 12.

The filter cartridge 12 contains the plant material. When the solvent 100 is injected into the filter cartridge 12, the solvent 100 strips the plant material of its oil, and mixing with it, forming a slurry. The slurry runs through the filter 28 and through an opening in the filter cap 22. The filter cap 22 screws onto the bottom of the filter cartridge 12 to hold the filter 28 in place. The opening may have a diameter of about ⅛ inch which directs the flow of the slurry mix into the center of the collection bowl 14, which sits on top of a heating element 18. The heating element 18 may maintain the temperature of the bottom of the collection bowl 14 to about 90-110° F., which counteracts the cooling effects of the expanding gas inside an area of lower pressure. The heavier extracted oil stays on the bottom of the collection bowl 14 while the volatile solvent gas evaporates. The vapors rise to the top of the evaporation chamber 16 and is vacuumed out through a circulation line by the circulation pump 34.

The circulation pump 34 is activated by opening the circulation valve (V4). The circulation valve (V4) is connected to a circulated pump switch 40 that is activated when the handle 68 is lifted. The switch 40 provides power to the pressure switch 36. The pressure switch 36 is a normally open switch that closes (ON) at 20 psi, and opens (OFF) at 0 psi. This regulates the pressure inside the evaporation chamber 16, by turning the circulation pump 34 on and off. The vapors that are vacuumed by the circulation pump 34 into the circulation line and passes through a filter dryer 24, to remove any contaminants, before being compressed. When the vapors are compressed they liquefy and pass through a check valve (V1), and travel along the heat exchanger 21 and fans 20 to be cooled down. The cooled liquid then goes back to the solvent canister 10, ready to be used.

Figure 4A:
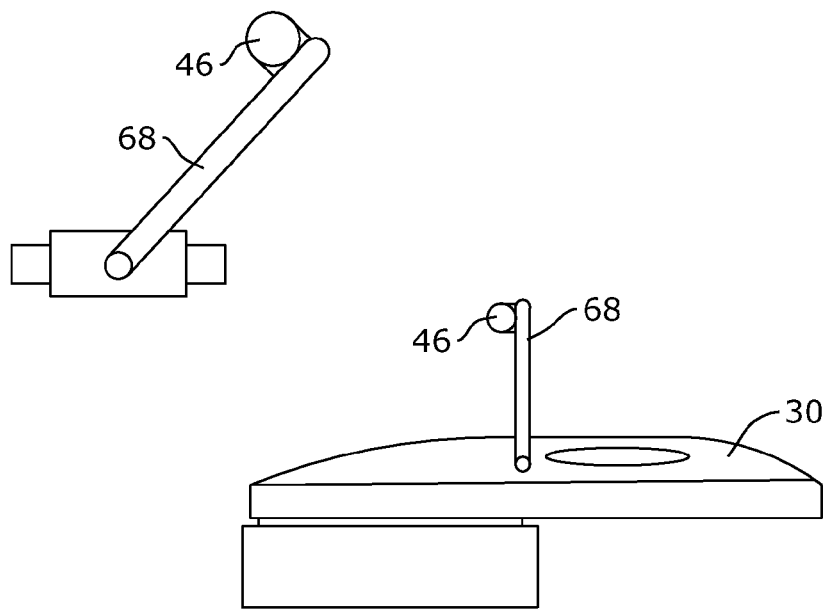
FIG. 4A is an section detail view of a lid of the present invention.
Figure 4B:
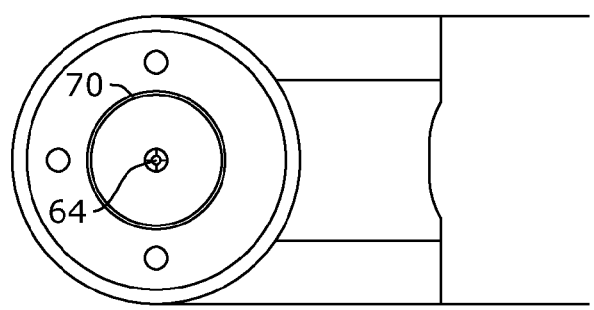
FIG. 4B is a bottom view of the lid of the present invention.
Figure 4C:
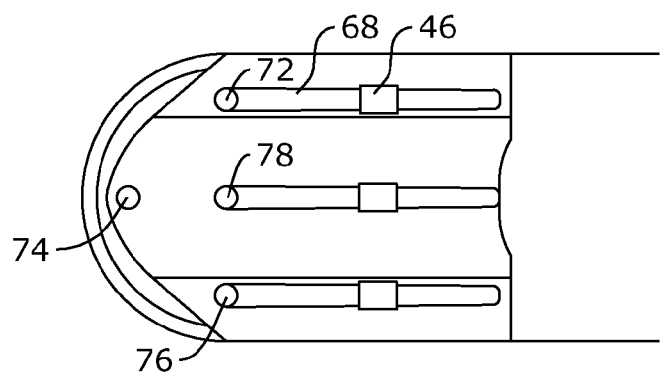
FIG. 4C is a top view of the lid of the present invention

FIGS. 4A through 4C illustrate the movable lid 30. As illustrated, the lid 30 may include the vacuum port 72, the pressure gauge and pressure switch port 74, the circulation pump port 76, and the gas inlet port 78. The vacuum line may run from the vacuum port 72 to the vacuum valve (V5). The circulation line may run from the circulation pump port 76 to the circulation valve (V4). The gas line may run from the gas inlet port 78 to the gas inlet valve (V3). The pressure gauge and pressure switch port 74 may be directly connected to an equalizer valve (V6) and a pressure gauge 26. The gas inlet port 78 leads into the gas inlet nozzle 64 of the bottom of the lid 30. The bottom of the lid 30 may further include a threaded mating portion 70 to mate with and form an air tight connection with the filter cartridge 12. The gas inlet nozzle 64 is positioned to feed into the filter cartridge 12, while the vacuum port 72, the pressure gauge and pressure switch port 74, the circulation pump port 76 feed in and out of the evaporation chamber 16. The ports 72, 74, 76, 78 may be set on the top for easy access, with long valve stems, i.e. handles 68. The stems may tuck within the surface of the top 30 with only the rings 46 exposed when they are in the closed (down position). The rings 46 allow for easy lifting of the valve stem with the fingers. Utilizing the above setup may prevent accidental opening of the valves. Further, the handles 68 give the user a visual confirmation that a valve is open when it is in the up position.

FIGS. 5 and 6 illustrate the components of the filter cartridge assembly. The filter cartridge assembly includes the filter cartridge 12 having a top end and a bottom end. The filter cartridge 12 may be made out of food grade stainless steel pipe. The filter 28 is placed under the bottom, and is secured in place by the filter cap 22. The filter 28 can be made out of a 50 micron fabric to keep the plant material from falling into the extract. The filter cap 22 may be made of food grade stainless steel material having the ⅛ inch hole at the bottom. This allows for the liquid slurry mix to escape with the flow directed toward the center of the collection bowl 14.

FIG. 7 illustrates how the evaporation chamber 16 encloses the filter cartridge 12. In certain embodiments, the evaporation chamber 16 includes a handle 86 and may directly connect or interlock with the lid 30 forming an air tight seal. The collection bowl 14 may include its own handle 88 and may connect or interlock with the bottom of the evaporation chamber 16 forming an air tight seal. This allows all the vapors to be captured, compressed, and recycled. Each of the connections may be a quick release interlocking mechanism so that the present invention may be easily disassembled and assembled.

Figure 8:
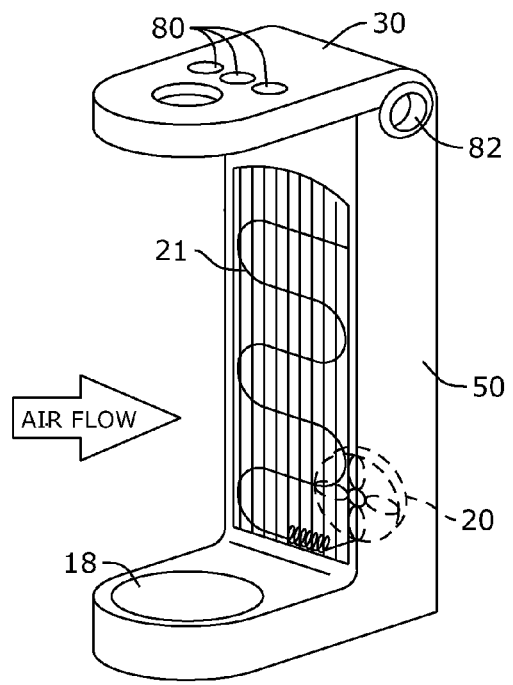
FIG. 8 is a perspective view of the heat exchange system within the housing of the present invention.
Figure 9:
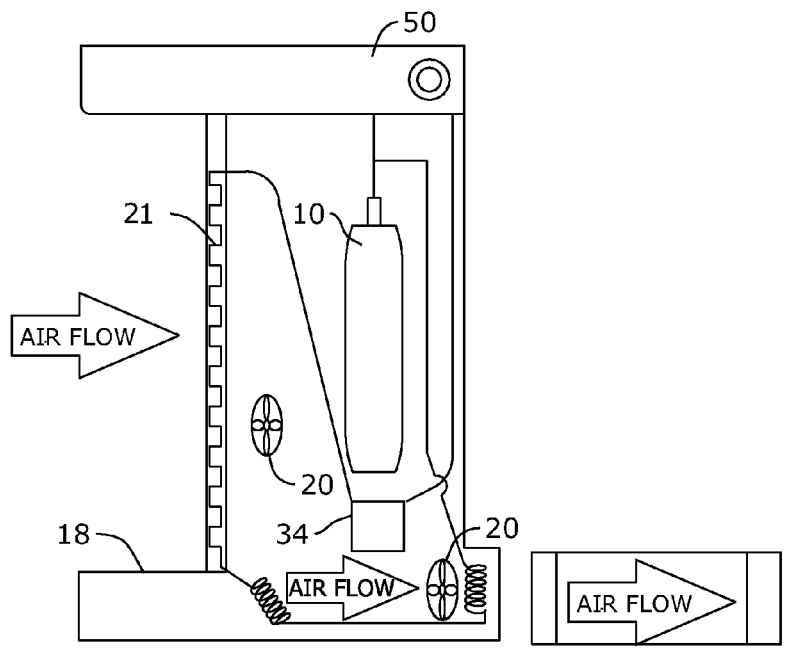
FIG. 9 is a schematic view of the heat exchange system of the present invention.

FIGS. 8 and 9 illustrate the air flow through the heat exchanger 21 and fans 20 fixed within the housing 50. Any time the main switch 44 is on to power the present invention, the fan 20 may also be on. This provides an air flow away from the user, so that in any situation that a leak should occur, the vapors would be directed away and mixed with large volumes of air so that there would not be enough concentration of vapors to cause an explosion. This set up also provides rapid cooling of the liquefied vapors even in a small space.

A method of using the present invention may include the following. The present invention may be plugged in and the main power switch 44 may be turned on, which activates the pumps 32, 34. The air is vacuumed out by opening the vacuum valve (V5), and the gas port valve (V3). When vacuum is achieved, all the valves may be closed, and the solvent canister 10 is filled via the refill valve (V7). The refill valve (V7) may accept any commercially available pure butane canisters with a nozzle. In certain embodiments, the solvent canister 10 may hold approximately 1.2 Liters of liquid solvent.

To prepare the present invention prior to loading the plant material, the user presses the equalizer valve (V6) to allow the pressure inside the containment units to equalize with atmospheric pressure. This facilitates opening and separation of the parts. The movable top 30 is lifted and the collection bowl 14 is separated from the evaporation chamber 16. This provides access to the filter cartridge assembly, which is removed from the movable top by unscrewing the filter cartridge 12 from the bottom of the moveable lid 30. The filter cap 22 is separated from the filter cartridge 12 and the filter 28 may be set aside.

The plant material is first rough grounded to make packing easier. Then, the filter cartridge 12 is filled with the grounded plant material, and packed tightly. A tightly packed filter cartridge 12 creates resistance to the flow of solvent, enabling it to work its way around the plant material slowly. The filter 28 is placed on the bottom of the filter cartridge 12, and is held in place by the filter cap 22 that attaches to the filter cartridge 12 by a threaded connection, forming the filter cartridge assembly. Then the collection bowl 14 is reattached to the evaporation chamber 16 forming an air tight container around the filter cartridge assembly. For commercial applications, several filter cartridge assemblies can be filled and ready for extraction when doing large volume production. Once everything is in place, the process begins.

To start the process, the main switch 44 is turned on. This provides power to the pumps 32, 34. The switch 44 may also turn the fans 20 on, and air is drawn away from the user and directed towards the back of the apparatus. The present invention may start with the solvent canister 10 filled while all the valves in the closed position. First, the vacuum valve stem or handle 68 may be lifted to the ON position. This action opens the vacuum valve (V5) to allow air to be vacuumed out of the evaporation chamber 16, which also turns on the vacuum pump 32 via the vacuum switch 38 that is triggered by this single action.

When the pressure gauge 26 reads −30 in/HG, which occurs in about 20 seconds, the valve stem or handle 68 is lowered, which closes the valve and shuts the vacuum pump 32 off as well. The tank valve (V2) is opened at this point. This allows the solvent 100 to flow into the heat exchanger coils 21, initially cooling it due to the expansion of the solvent 100 in a vacuum. From this point, the heat exchanger coils 21 secure some solvent.

The gas port valve stem or handle 68 may be lifted allowing the solvent 100 into the filter cartridge 12 and thereby filling it up, while slowly flowing through the plant material and filter 28, exiting at the bottom hole, and falling into the collection bowl 14 carrying the extracted oil within. At this point, the heating element 18 is switched on separately on a different toggle switch 42. The gas port valve (V3) is left open for about 10 minutes to extract as much oil from the plant as possible.

The circulation valve stem may then be lifted, triggering the circulation pump switch 40 to provide power to the pressure switch 36. The circulation may not be activated until the chamber pressure reaches 20 psi. When this happens, the circulation pump 40 starts vacuuming the vapors, compressing and recycling the liquefied solvent 100 back into the canister 10 and ultimately back into the extraction process, in an endless loop.

After 10 minutes of run time, the gas port valve (V3) may be closed, while the circulation valve (V4) remains open for another 10 minutes. The circulation pump 34 is regulated by a pressure switch 36, so it only turns on when the pressure builds up, allowing recovery of any solvent 100 left in the mix, redirecting every last drop back to the gas tank 10. After 10 minutes of 0 psi reading, the circulation valve stem is lowered to close the circulation valve (V4) and turn off the circulation pump.

The last step may include the purging process. The purging process may purify the oil and removes any last bit of solvent 100 remaining within the evaporation chamber 16. The vacuum valve stem may be lifted once again to open the vacuum valve (V5) and run the vacuum pump 32 once more. When 30 in HG is achieved within the evaporation chamber 16, the valve stem is lowered closed, turning the vacuum pump 32 off. After 10 minutes, the heating element 18 is also turned off, and so is the main switch 44. The apparatus may then be ready to be opened and reloaded. During the subsequent cycles, only the three valves stems may be manipulated to run the process. The valves may be turned on and off in succession from left to right to prevent confusion.

It should be understood, of course, that the foregoing relates to exemplary embodiments of the invention and that modifications may be made without departing from the spirit and scope of the invention as set forth in the following claims.

What is claimed is:

1. An oil extraction device comprising:
   an evaporation chamber comprising a top end and a bottom end, wherein the top end is sealed and the bottom end comprises a collection bowl;
   a filter cartridge sealed within the evaporation chamber, wherein the filter cartridge comprises a top end, a bottom end, and an internal cavity formed to secure a plant product within, wherein the bottom end comprises a filter and a drip cap comprising an opening leading into the collection bowl;
   a solvent canister;
   a delivery line leading from the solvent canister into the top end of the filter cartridge;
   a circulation line leading from the top end of the evaporation chamber to the solvent canister; and
   at least one pump,
   wherein a solvent travels from the solvent canister into the filter cartridge traveling through the opening and turning into a vapor, wherein the vapor is vacuumed out of the evaporation chamber and into the circulation line, thereby traveling back to the solvent canister.

2. The oil extraction device of claim 1, further comprising a lid having a top surface and a bottom surface, wherein the evaporation chamber and the filter cartridge are releasably sealed to the lid and wherein the delivery line and the circulation line run through the lid.

3. The oil extraction device of claim 2, further comprising a housing, wherein the lid is attached to the housing, the solvent canister is secured within the housing, and the housing supports the oil extraction device in an upright position.

4. The oil extraction device of claim of claim 1, further comprising a power switch connected to the at least one pump.

5. The oil extraction device of claim 4, wherein the at least one pump comprises a first pump and a second pump wherein each of the first pump and the second pump are connected to the power switch.

6. The oil extracting device of claim 5, wherein the circulation line is connected to the first pump and runs from the first pump through a cooling mechanism turning the vapor into a liquid form and transporting the liquid form into the solvent canister.

7. The oil extracting device of claim 6, wherein the cooling mechanism is at least one of a fan and a heat exchanger.

8. The oil extraction device of claim 7, further comprising a vacuum line leading from the evaporation chamber to the second pump and from the second pump to an exhaust fan.

9. The oil extractive device of claim 8, further comprising a plurality of valves operable to open and close passage ways through the delivery line, the circulation line and the vacuum line.

10. The oil extraction device of claim 9, wherein the plurality of valves comprise a gas port valve attached to the delivery line in between the solvent canister and the filter cartridge, a circulation valve attached to the circulation line in between the evaporation chamber and the first pump, a check valve attached to the circulation line in between the first pump and the solvent canister, and a vacuum valve attached to the vacuum line in between the evaporation chamber and the second pump.

11. The oil extraction device of claim 1, further comprising a heating element operable to heat the collection bowl.

* * * * *